United States Patent [19]

Klashka et al.

[11] Patent Number: 4,896,266

[45] Date of Patent: Jan. 23, 1990

[54] BUS ACTIVITY SEQUENCE CONTROLLER

[75] Inventors: John A. Klashka, North Andover; Sidney L. Kaufman, Stoughton; Krzysztof A. Kowal, Framingham, all of Mass.; Richard P. Lewis, Sandown, N.H.; John L. McNamara, Jr., Tweksbury, Mass.

[73] Assignee: Bull HN Information Systems Inc., Billerica, Mass.

[21] Appl. No.: 57,460

[22] Filed: Jun. 3, 1987

[51] Int. Cl.⁴ .............................................. G06F 13/32
[52] U.S. Cl. ............................... 364/200; 364/242.33; 364/241.1
[58] Field of Search ... 364/200 MS File, 900 MS File

[56] References Cited

U.S. PATENT DOCUMENTS 4,292,668  9/1981  Miller et al. ........................ 364/200
4,417,304  11/1983 Dinwiddie, Jr. .................... 364/200
4,490,788  12/1984 Rasmusson ......................... 364/200
4,688,166  8/1987  Schneider .......................... 364/200
4,760,515  7/1988  Malmquist et al. ................. 364/200

Primary Examiner—Eddie P. Chan
Attorney, Agent, or Firm—George Grayson; John S. Solakian; Gerald J. Cechony

[57] ABSTRACT

The present invention relates to a computer system having a sequence controller for allowing direct memory access devices to access peripheral devices. The sequence controller allows the peripheral devices access to a global bus by providing access in a round-robin fashion. A microprocessor associated with the sequence controller and direct memory access has access to the global bus after each direct memory access. The amount of data allowed to be transferred in each direct memory access is restricted so that each device is equally serviced.

13 Claims, 8 Drawing Sheets

BUS ACTIVITY SEQUENCE CONTROLLER

BACKGROUND OF THE INVENTION

This invention relates to a computer system having a sequence controller for accessing peripheral devices.

In many data processing systems, a common bus is used to link together a plurality of units to the system. The bus permits any two units linked to the system to communicate or transfer information between each other.

Typically, communication is established by any unit by making a request to the bus for a bus cycle. When that bus cycle is granted, the requesting unit becomes the master and may address any other unit, linked to the bus, as a slave.

Transfers requiring a response from a slave unit, such as a read memory transfer from the slave, require a response cycle. In these cases, the master indicates a response is required and identifies itself to the slave. When the required information becomes available, the slave will assume the role of the master and initiate a transfer of information to the requesting unit. Thus, with such an interchange, two bus cycles are required. During the time it takes the slave to respond, other units may use the bus to communicate with any other unit that does not involve the master-slave units above. In the event that two units request simultaneous service from the bus, tie-breaking logic may be included at each unit directly coupled to the bus.

A typical data processing system utilizing a common bus is shown in FIG. 1. As shown, a bus 100 which often comprises multiple lines, is coupled to a memory storage unit 102. The memory storage unit may comprise several memory storage units, each in communication with the bus. Also connected to this data processing system is a scientific-arithmetic unit 108 and three controllers: a basic device controller 110, a communications controller 112, and a mass store/magnetic tape controller 114. The basic controller 110 is coupled to the bus to allow multiple unit record peripheral devices 116 to have access to the bus 100. Using the basic controller in this manner avoids larger demands on the bus that would result if each unit record peripheral device had a direct access to the bus. Similarly, a communications controller 112, which is used to provide communication control via modem devices, and a mass store/magnetic tape controller 114, which is used to control mass storage devices such as a tape peripheral device 118 or a disk peripheral device 120, is in communication with the bus 100.

In addition to the above devices, a central processor 106 is connected to the bus for controlling the bus cycles and regulating data transferred over the bus. Thus, any one of these devices which are coupled to the bus 100 may address or communicate with any other unit connected to the bus 100. For example, the tape peripheral 118 may address the memory storage unit 102 by way of the controller 114.

To insure that the proper unit is addressed by a master unit, a channel number exists for every end point in the system with the exception of the memory type processing elements. In those cases, a channel number is assigned to each device along with the memory address identifying the end point. Some devices, such as a full duplex device, utilize two channel numbers. Others, such as an output only or an input only device, use only one channel each. Units with multiple inputs and outputs ports generally require a block of consecutive channel numbers to distinguish between the different ports.

With such a system, different priorities are established for accessing the bus. For example, when a peripheral has access to the bus via a controller, all other peripherals connected to this controller would be locked out or denied access to the bus.

Further details regarding the above type of bus system is disclosed in the following U.S. patents. The referenced patents pertain to the proprietary bus system of Honeywell.

(a) Data Processing System Providing Split-Bus Cycle Operation by Frank V. Cassarino, Jr. et al, issued Dec. 14, 1976, and having U.S. Pat. No. 3,997,896.

(b) Data Processing System Providing Locked Operation of Shared Resources by George J. Barlow et al, issued Dec. 28, 1976, and having U.S. Pat. No. 4,000,485.

(c) Data Processing System Having Distributed Priority Network by George J. Barlow, issued June 14, 1977, and having U.S. Pat. No. 4,030,075.

(d) Data Processing System Having Distributed Priority Network with Logic for Deactivating Information Transfer Requests by George J. Barlow, issued June 20, 1978, and having U.S. Pat. No. 4,096,569.

(e) Apparatus for Processing Data Transfer Requests in a Data Processing System by Frank V. Cassarino, Jr. et al, issued Nov. 23, 1976, and having U.S. Pat. No. 3,993,981.

(f) Data Processing System Having a Data Integrity Technique by George J. Barlow, issued Nov. 30, 1976, and having U.S. Pat. No. 3,995,258.

DISCLOSURE OF THE INVENTION

The present invention relates to a sequence controller, which allows peripheral devices access to a computer system. The sequence controller comprises a microprocessor coupled to a global bus for setting up tasks or communication links between the peripheral devices and the rest of the system over the system bus. Preferably, four adapter ports are provided by the sequence controller to allow coupling of up to four adapters. Each adapter may have one or more peripheral devices connected to it.

Once the microprocessor has set up the particular communication link, control of the global bus is relinquished to a direct memory access controller, which provides a channel for each adapter port. Once a channel is established, data can be transmitted between the peripheral devices and the rest of the system.

The sequence controller alternates between each of the four channels and the microprocessor in turn to allow each adapter equal access to the global bus and to allow the microprocessor access after each adapter access. The alternating sequence controller comprises a free running cycle counter and a decoder in communication with the counter for separating successive counts into separate events. Logic circuitry is used for polling each of the adapter ports and the microprocessor for request signals to determine if data is to be transferred to or from each adapter and for combining the request signals from each of the adapter ports and the microprocessor with each of the events for alternating access to the global bus.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
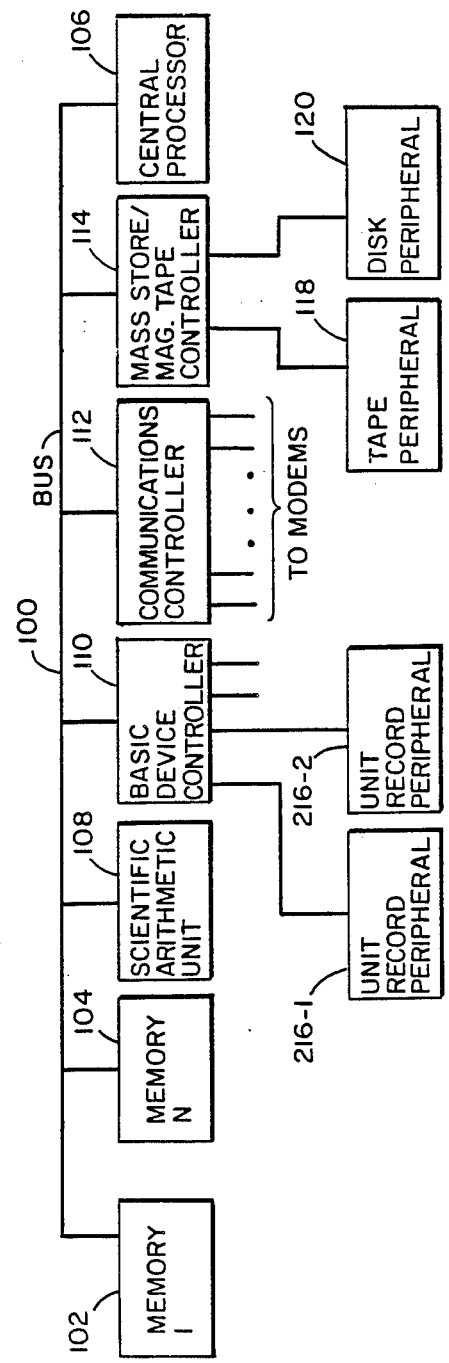
FIG. 1 is a schematic drawing of a computer system utilizing a bus architecture.
Figure 2:
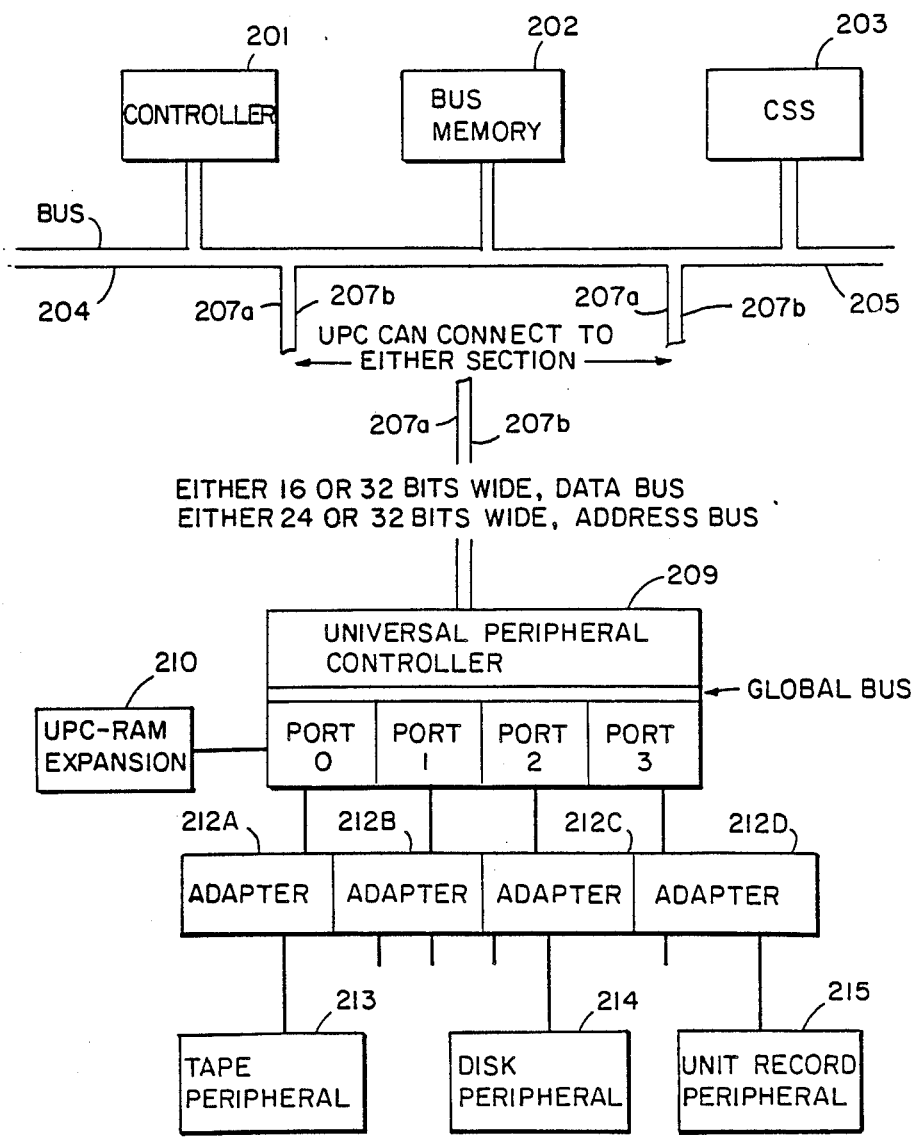
FIG. 2 is a block diagram of a computer system embodying the present invention.

In accordance with the present invention, a universal peripheral controller (UPC) 209 is provided. The UPC may control different types of peripheral devices without requiring different controlling devices. As shown in FIG. 2, the UPC 209 is coupled to a system bus 204 by a data bus 207a and an address bus 207b. The UPC may be coupled along the system bus 204 so that it receives a higher priority status than other devices coupled to the system bus 204. The data bus 207a may be either 16 or 32 bits wide, and the address bus 207b 24 or 32 bits wide. With such an interface assembly, communication may be made to and from any peripheral coupled to the system bus through the UPC.

The UPC 209 may interface with up to four peripheral adapters 212, A-D where each adapter has one or more channels. A total of up to eight logical channels are accessible through each UPC. Typical peripherals which may be coupled to the adapters 212, as shown, include a tape peripheral 213, a disk peripheral 214, and a unit record peripheral 215. To insure proper data rate synchronization and error detection, each adapter provides a buffer for data storage.

Figure 3:
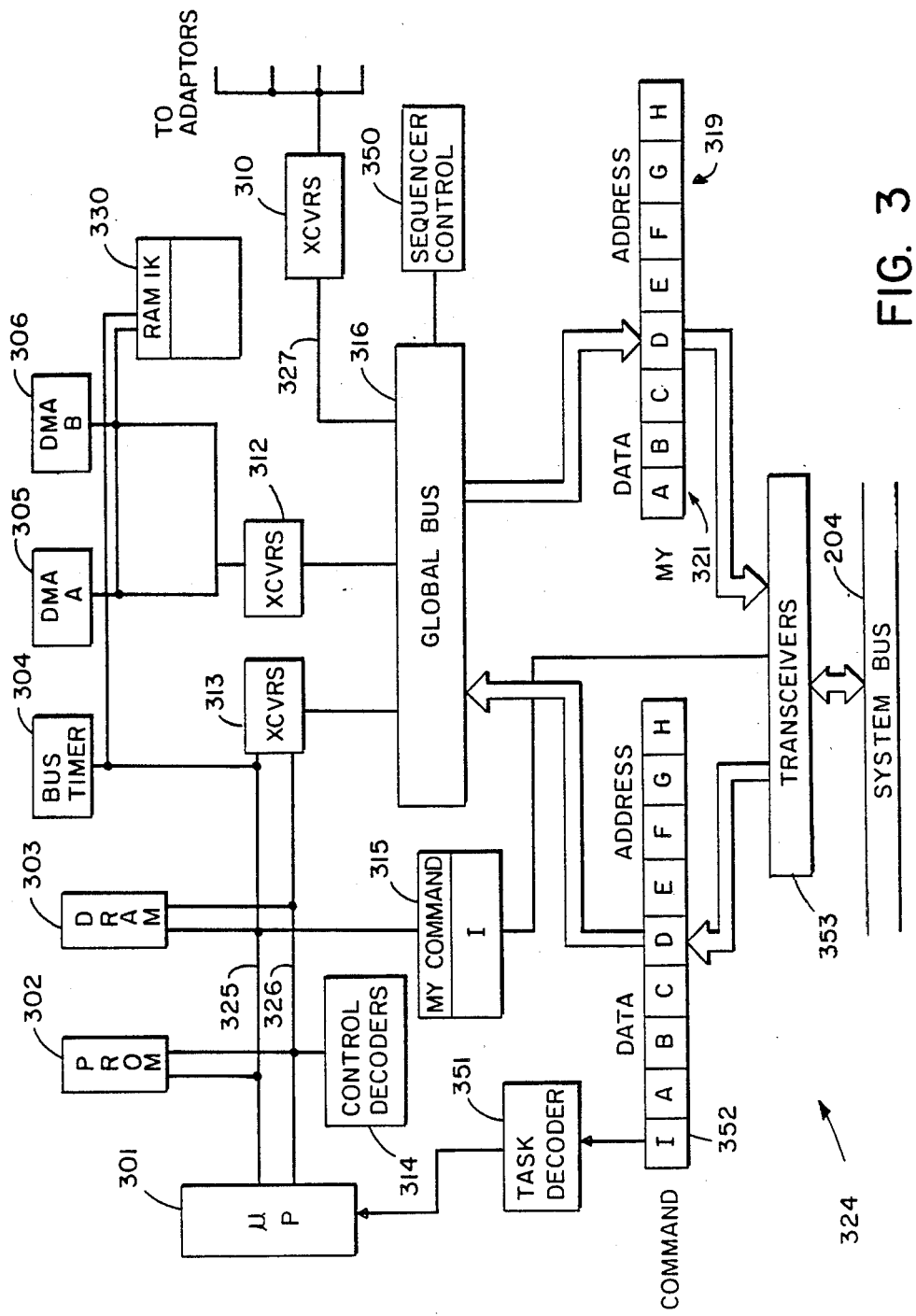
FIG. 3 is a more detailed block diagram of elements of FIG. 2.

A more detailed block diagram of the Universal Peripheral Controller 209 is shown in FIG. 3. A commercially available Motorola 68000 type micro-processor 301 is coupled to an internal data bus 325 and an address bus 326. Coupled to the data bus 325 is a commercially available read only memory (PROM) 302, a commercially available dynamic random access memory (DRAM) 303, and a MY COMMAND register 315. The DRAM 303 may have storage capacity for at least 64K words and is provided with random logic implementation to refresh information stored therein. The PROM 302, the DRAM 303, as well as commercially available control decoders 314 are coupled to the address bus 326.

A commercially available timer 304 is coupled to the data bus 325 for providing three functions. The first function of the timer 304 is to detect responses to a request for the global bus 316 (discussed below). If there is no response to a request, than the timer 304 is to notify the microprocessor 301. The second function of the bus timer 304 is to determine if the instruction being executed takes longer than a predetermined value and to determine whether it must abort the execution of the instruction. Finally, the third function of the bus timer 304 is to determine if there is a DMA request cycle which takes longer than a predetermined period and to abort that DMA cycle if such a case exists (discussed in detail below).

A global bus 316 is coupled to the data bus 325 and the address bus 326 by way of commercially available transceivers 313. The global bus 316 is, in turn, coupled to an interface 324 of the system bus 204. Within the system bus interface 324, there are command registers 352 for receiving data from the system bus, each having 9 bits including a parity bit P. The registers 352 comprise a control register I, data registers A, B, C and D and address registers E, F, G and H. Commercially available transceivers 353 are also included in the system bus interface 324. The global bus 316 is also coupled to the adapters 212 of FIG. 2 via commercially available transceivers 310.

A MY ADDRESS REGISTER 319 and MY DATA REGISTER 321 are coupled to the global bus 316. These registers each have 4 bytes. MY DATA REGISTER 321 has bytes A, B, C and D, each 9 bits wide including a parity bit. MY ADDRESS REGISTER 319 similarly has 4 bytes E, F, G and H each 9 bits wide including a parity bit. The bytes of the MY DATA and MY ADDRESS REGISTERS A to D and E to H, respectively, correspond to the command data and address registers 352 A to H. Also coupled to the global address and data bus 316 are two commercially available DMA chips 305 and 306 by way of transceivers 312.

The essential feature of the peripheral controller 209 is to have the microprocessor set up the paths between the devices attached to the adapters 212A-D and other units connected to the system bus 324, including the system's memory. Once the microprocessor 301 has set up the communication link between a given peripheral and the system memory, it turns over the task of managing the transfer to one of the DMA devices 305, 306 associated with that device. Access to the global bus from various adapters is controlled in a round-robin fashion. The addresses and ranges of data transfer for the DMA chips 305 and 306 are provided by the microprocessor via transceivers 312, 313 and the global bus 316.

A typical request for service via the system bus and its subsequent response by the DMA chip controller sequencer system may be accomplished in the following manner. When a request is received by the multiple DMA controller system (discussed below), which identifies a channel number of the system, the information is stored in a task decoder 251 coupled to the system bus 324. The data and the address pertaining to this request will be stored in MY DATA REGISTER 321 and MY ADDRESS REGISTER 319 as they arrive. The task decoder 251 determines the particular ports/channels that this new request is to service. The microprocessor 301 then determines whether or not that particular channel identified by the request is available, and it signals Ramware means (not shown) that a request had been received for a particular adapter. (The Ramware means is the subject of another invention assigned to the same assignee as the instant invention and filed on Oct. 31, 1986 as Ser. No. 925,431 and having the title "Universal Peripheral Controller Self-Configurating/Bootloadable Ramware," invented by John Klashka et al.) The microprocessor 301 then links up the particular DMA chip, 305 or 306, that is to handle the request and sets up the parameters that the chip will require, such as the starting address, the range address, as well as other parameters.

For example, in the case of an adapter able to access words 16 data and 2 parity bits wide, the particular adapter involved in the transfer makes a request which is placed on the internal bus 327 by way of the transceivers 310. This request is received by a sequence controller 350 (discussed in greater detail below) which grants access to the global bus 316. The DMA chip then notifies the system bus memory 202 (shown in FIG. 2) that it is ready to transfer information between a particular location in memory and between the adapter's buffer memory. The information requested from a particular location in memory will be applied to the system bus interface 324 and made available to the global bus 316. As previously discussed, the information available on the system bus interface 324 will be up to 4 bytes wide. These four bytes are broken up into two word transfers. In the case of an adapter being able to only access a byte, four separate transfer operations are required by way of the DMA chip 305 or 306, the MY REGISTERs 319,321, the global data and address bus 316, and the transceivers 310.

The purpose of the sequencer 350 is to provide equal access to the global bus to all of the adapters in a round-robin fashion rather than granting the global bus to the unit having the highest priority, which could block lower priority units from accessing the global bus 316 for considerable periods of time.

The sequencer 350 provides a round-robin access to the global bus 316 by first examining or polling the first adapter 212A to determine whether there is any information to be transferred to or from it. If there is information to be transferred to or from the first adapter 212A, access to the global bus 316 is granted to it. Preferably, up to 4 bytes is allowed to be transferred to and from an adapter per sequence. The sequence controller 350 will then advance to the next adapter 311a to determine whether it has a request for service. If it does, it will be serviced in a similar manner as the first adapter 212A. If there is no information that is to be transferred to this adapter, then the sequencer proceeds to the next adapter until all the adapters have been examined for service request and then serviced up to 4 bytes at a time. After the last adapter in the sequence has been examined, the sequencer 350 returns back to the first adapter 212a. Thus, each adapter is serviced in a round-robin fashion.

Integrated into the round-robin sequencing for servicing each adapter is a sequence dedicated to the microprocessor. Preferably the microprocessor is serviced between successive adapters. Providing the microprocessor 301 access to the global bus 316 allows the microprocessor 301 to service anticipated or unsolicited interrupts from other peripheral devices, internal or external to the UPC 209.

The sequencer 350 also provides a system minimizer which limits the round-robin sequencing scheme to the microprocessor and the port 0. For example, if during initialization of the system the system recognizes that there is only one adapter and it is connected to port 0, time wasted in polling other adapters for data transfer is avoided by limiting the round-robin sequencing to port 0 and the microprocessor.

Figure 4:
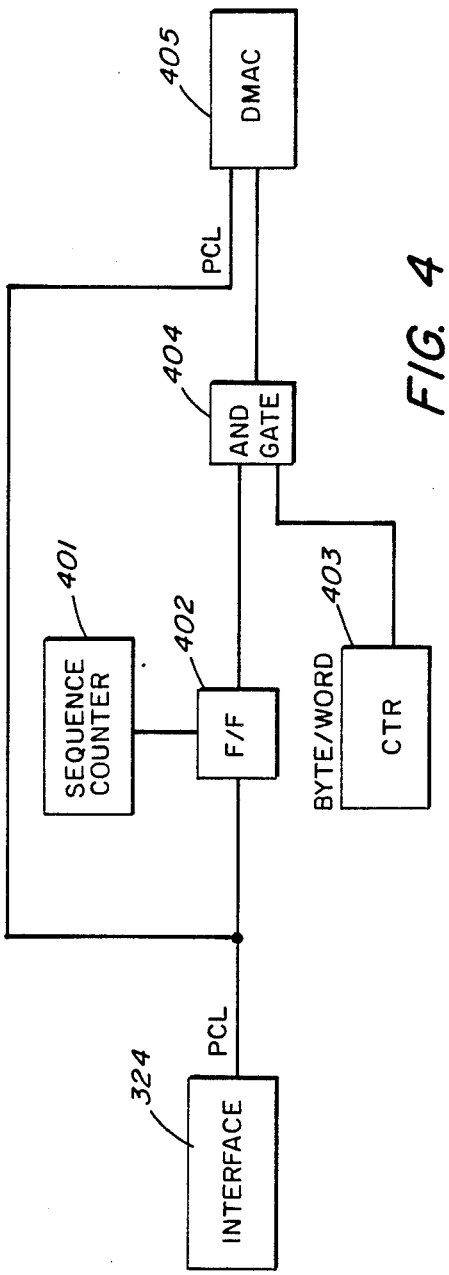
FIG. 4 is a block diagram of a DMA controller chip sequencer.
Figure 5:
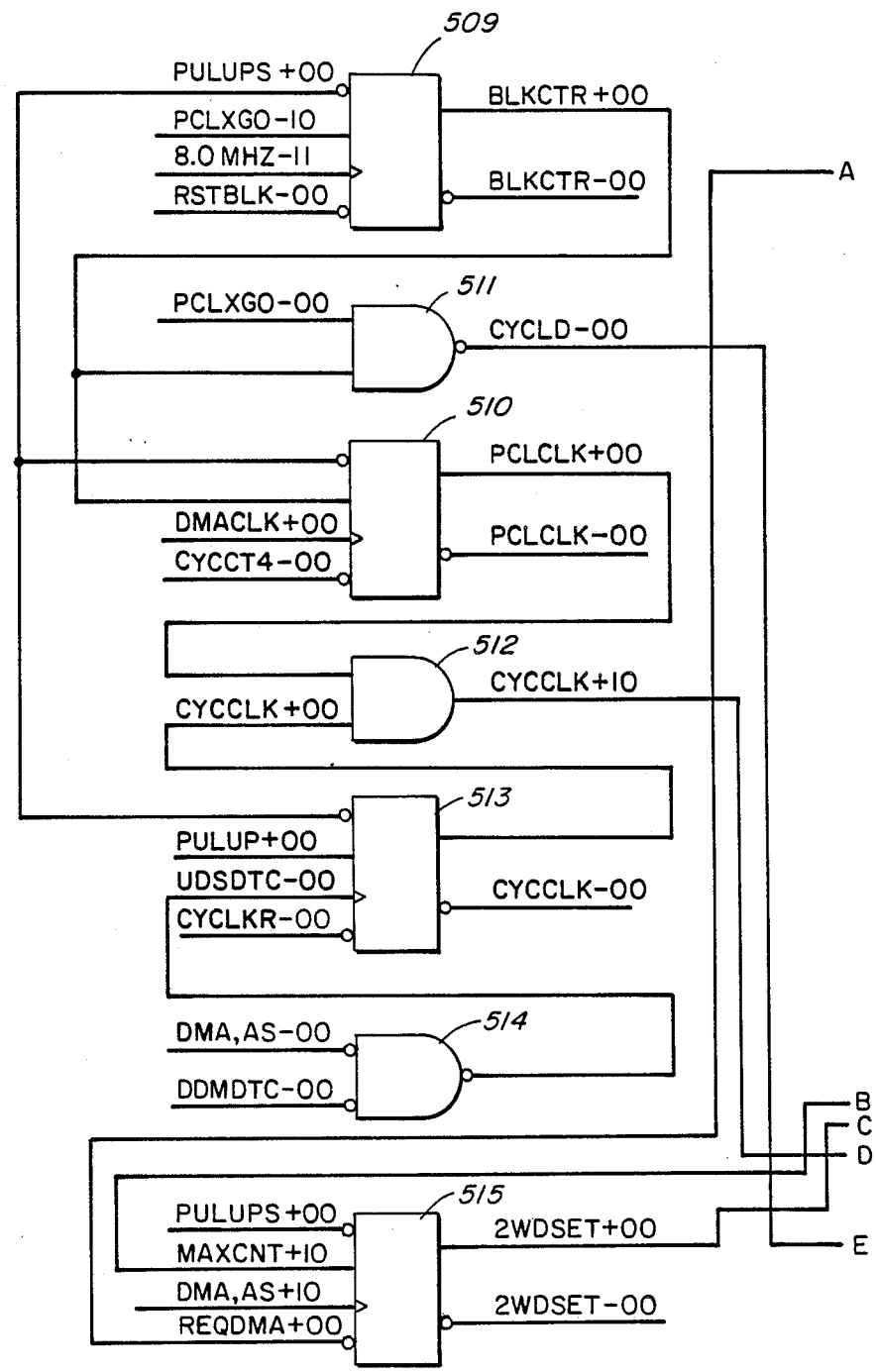
FIG. 5 is a detailed logic block diagram of the sequencer of FIG. 4.
Figure 5:
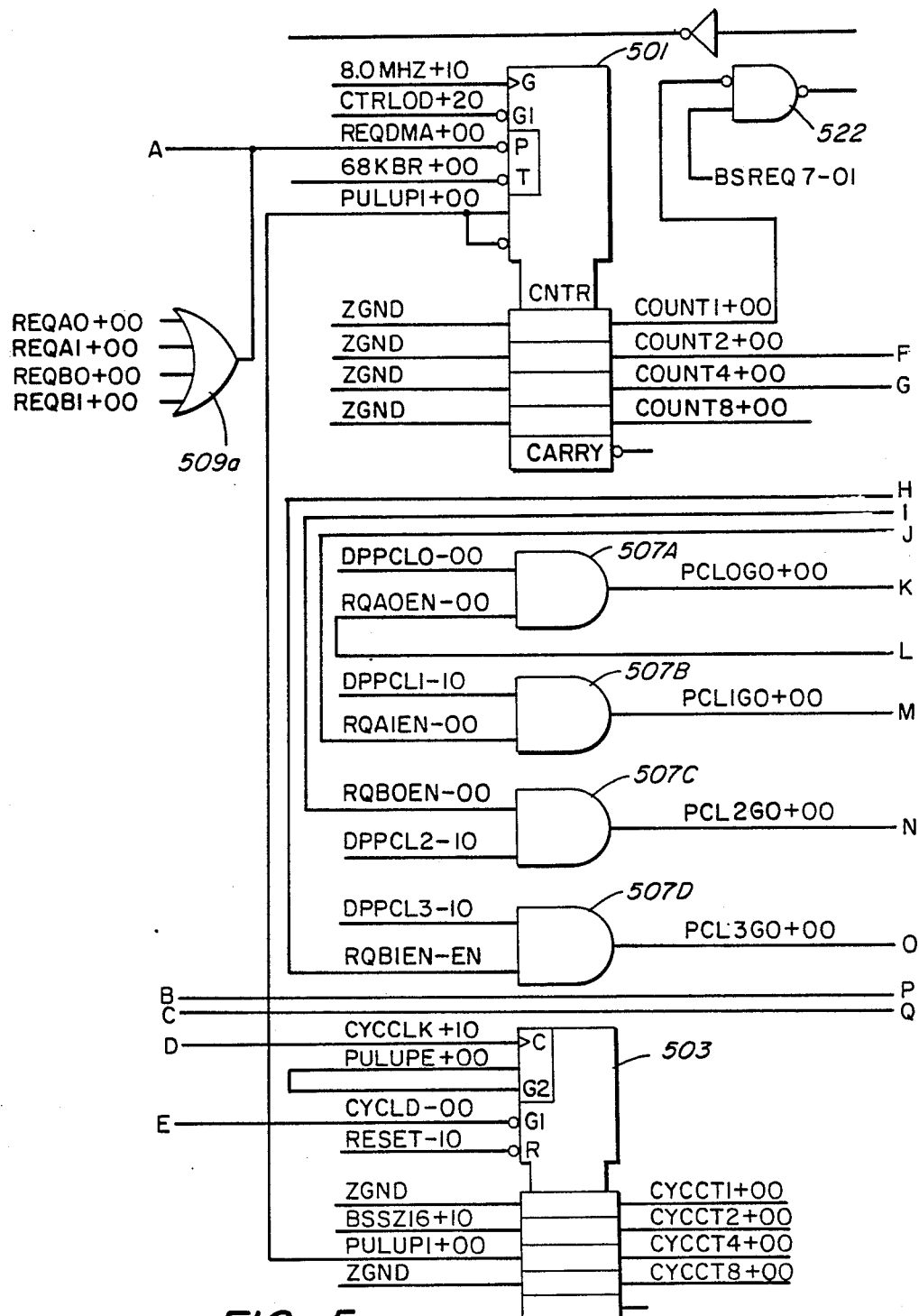
Figure 5:
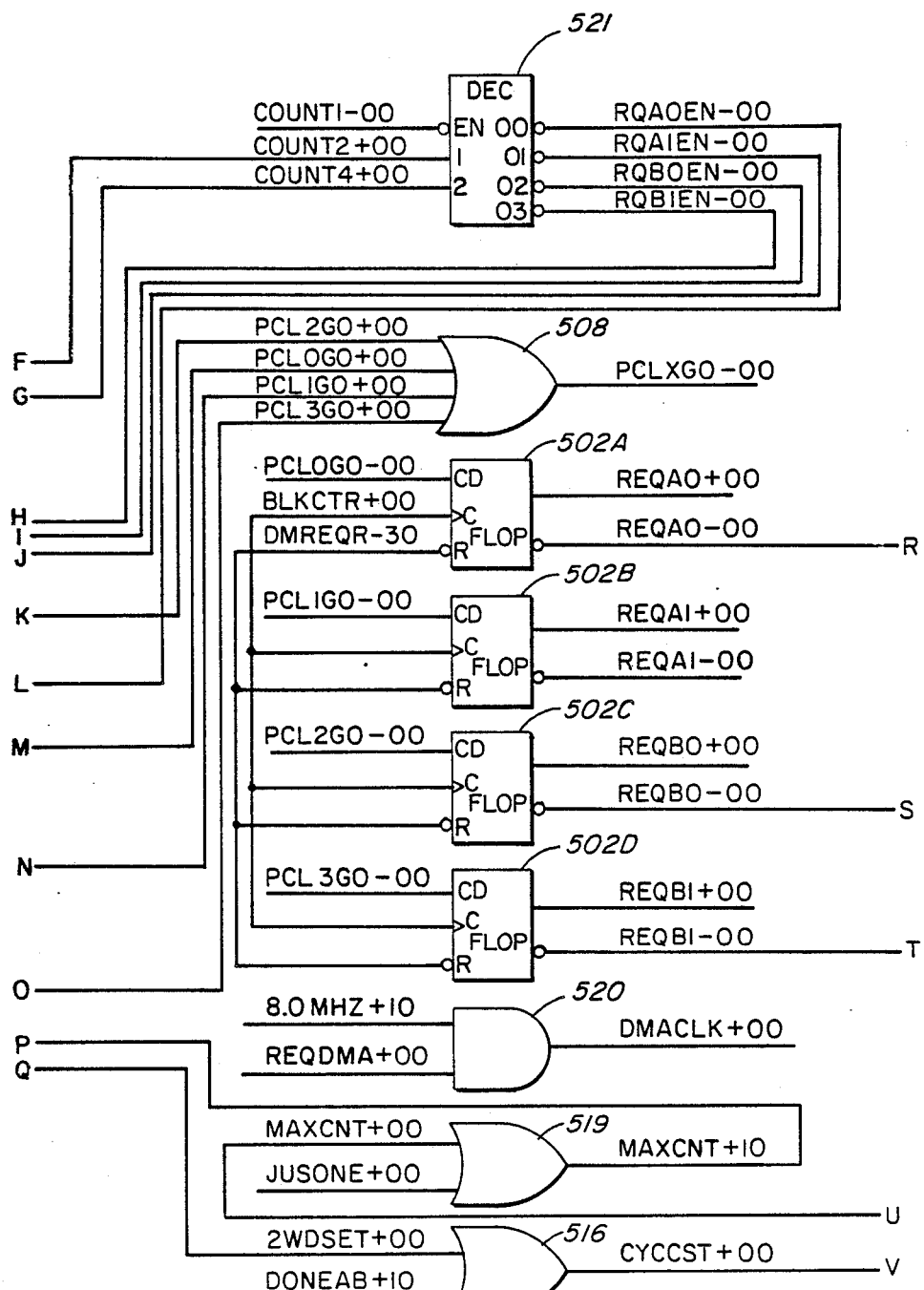
Figure 5:
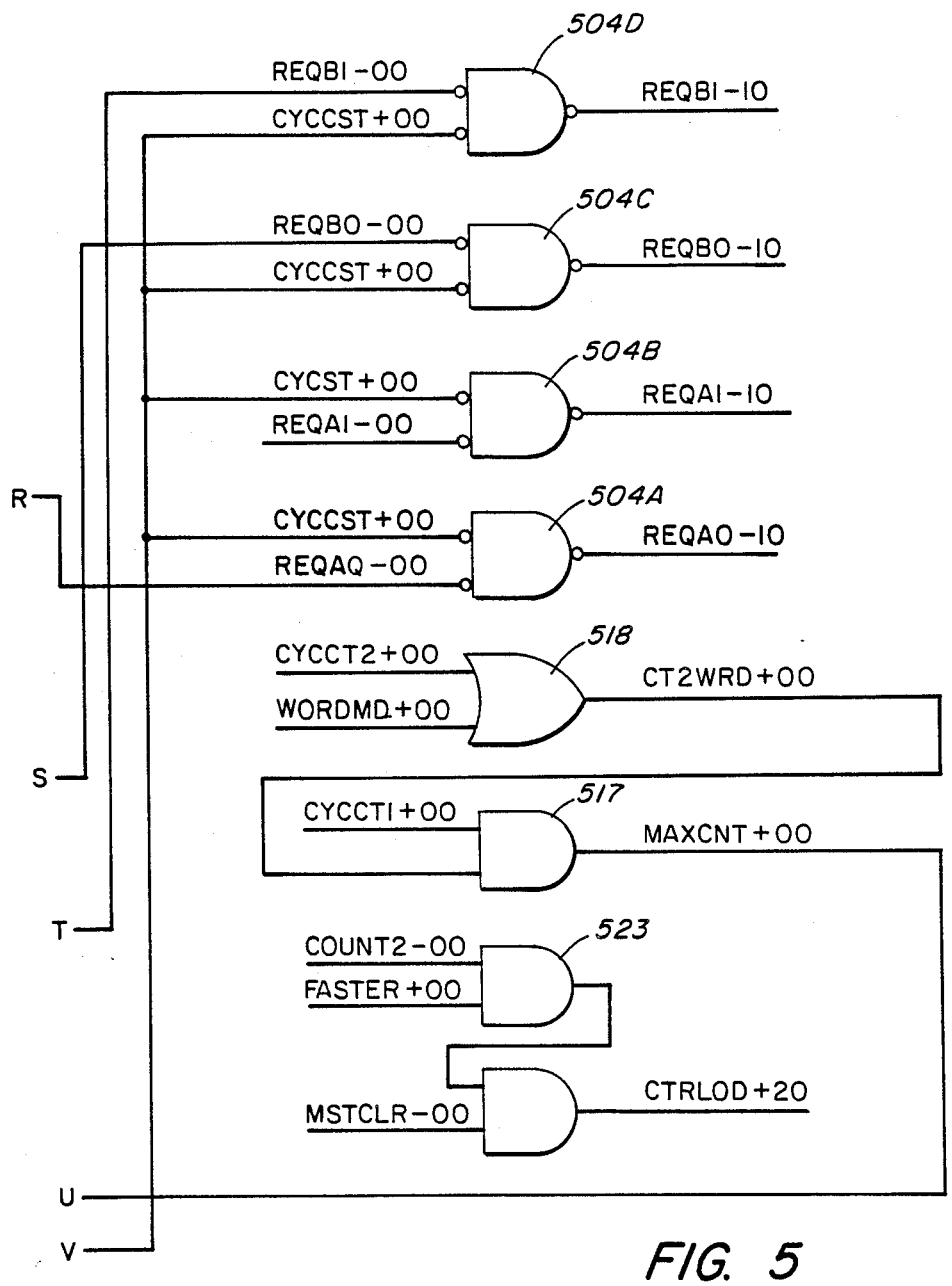

Referring now to FIG. 4, a high level block diagram of the DMA controller chip sequencer will be given. A more detailed logic block diagram of FIG. 4 is shown in FIG. 5. The sequence counter 401 in FIG. 4, which corresponds to the sequence counter 501 in FIG. 5, is a commercially available 74LS169 type of free-running counter that cycles sequentially through counts, each of which is associated with each one of the different adapters 212A-D or the microprocessor.

For example, when an adapter makes a request for service, it asserts a request signal PCL coupled to the DMAC 405. When the sequence counter 401,501 cycles to the count associated with the port 309 which has made a service request, a flip-flop 402, which corresponds to flip-flop 502a and 502d in FIG. 5 is set. By setting the flip-flop 402 latching logic is enabled to allow a data request to begin.

The output of the flip-flop 402 is coupled to an input of an AND gate 404, which corresponds to four AND gates 504A-504D in FIG. 5. The output of one of the four AND gates then becomes the request line REQ on the DMAC controller chip 405, also shown as the DMAs 305, 306 in FIG. 3. It is necessary to require a separate request line for each of the four channels of the DMAC controller chip 405 because a DMAC controller chip has more than one channel and has its own priority scheme. In order to defeat that priority scheme, a sequence operation, as described below, is designed so that two requests do not go to the same DMAC at the same time. When the request is made to the DMAC 405, it arbitrates on behalf of that port for access to the global bus 316. When access is gained, the DMAC 405 will begin the transfer of data to or from the adapter 309 to or from the system bus interface 324.

The number of bytes or words that are transferred during this cycle of data transfer is controlled by a byte/word counter 403,503. When the byte/word counter 403 reaches a maximum predetermined value, it controls the request line REQ to the DMAC 405 in such a way that the byte/word transfer is terminated after the last word has been transferred. Preferably, a maximum of 4 bytes are transferred during a port's request cycle.

Referring now to FIG. 5, the hardware and logic function of a typical data transfer will first be described and then the signal functions on the various logic gates will be described. To further simplify the description, a typical transfer of data taken from one of the four ports numbered 0, 1, 2 and 3, as shown in FIG. 2, will be associated with hardware having a reference numeral followed by a letter which corresponds to that port. For example, flip-flop 502A, AND gate 504A, and OR gate 507A are associated with port 0 as shown in FIG. 5. In other words, any transfer involving hardware designated with an A, B, C, or D after its reference numeral is associated with the port 0, 1, 2, 3 respectively. In this way, undue complication in the description will be minimized.

The counter 501 has output signals which are applied to a commercially available 74S139-type decoder 521. At the decoder 521, the signals are decoded to generate four separate time request periods during which the sequencer control 350 will allow data transfer from or to any given port.

When an adapter coupled to port 0 is ready to begin a data transfer sequence, it will assert a request signal on the peripheral control line (PCL). The PCL is coupled to an OR gate 507A which may be a commercially available 74AS1832-type gate utilized to provide an AND function. Accordingly, when the request signal is asserted by port 0 and the counter 501 enables the decoder 521 to allot a time period to port 0, gate 507A is enabled. The count which enables the decoder 521 is shown as COUNT1+00, COUNT2+00 and COUNT4+00 in FIG. 5. All are negated for adapter 212A. The output from the gate 507A is coupled to an input of a 74S20-type OR gate 508 and is utilized to generate a signal when a request is made by any of the four ports. The output of the OR gate 508 is applied to a commercially available 74LS74-type flip-flop 509. The flip-flop 509 then waits until the negative half clock cycle of a master clock (not shown) is set. (This delayed setting of the flip-flop 509 permits signals, being propagated and gated further along, to settle before the signal from the flip-flop 509 is asserted.) The flip-flop, which acts as a request flip-flop, is then set to hold the counter 501 in order to service the port 0 request. To that end, flip-flop 509 clocks flip-flops 502 and the outputs of the flip-flops 502 are ORed in OR gate 509A to provide the REQDMA+00 input to the counter 501.

The output of the flip-flop 509 is applied to a 74AS1804-type AND gate 511 and to a 74LS74-type flip-flop 510. Gate 511 is enabled which causes the load enable on a 74S161-type counter 503 to be enabled. The flip-flop 510 waits until its clock from gate 520 is in the next half cycle from the one that sets flip-flop 509 and then causes a clock pulse from flip-flop 510 to be applied to a 74AS1832-type gate 512 which then clocks the initial counter value into the counter 503.

Counter 503 is loaded with a value according to the size of the data bus of the system bus 324. If it is a 16 data bit bus, the counter 503 will be loaded with a count value that will cause the counter to transfer only one or two bytes of data. If the data bus is 32 bits wide, the counter 503 will be loaded with a value that will permit one to four bytes of data to be transferred. The output of the counter 503 is then initialized and ready to sequence as a data transfer begins.

The output of the gate 507A is clocked into flip-flop 502A by the output of flip-flop 509. The output of the flip-flop 502A is applied to an AND gate 504A which generates the request signal to the DMA 305,306. When the cognizant DMA recognizes the assertion of its request line for port 0, it will then begin a request cycle which may either request data from the system bus' main memory 202 to be sent to the adapter coupled to port 0 or collect the data from the adapter to be sent to the main memory 202, depending on whether a read or write transfer is being made.

As the bytes or words are transferred, a 74AS1832-type OR gate 514 used as an AND function monitors the address strobe control line and the data transfer complete control line of the DMA. The data transfer complete control line is asserted after each byte or word transfer and generates a clocking function to a flip-flop 513 which is then fed through an AND gate 512 causing the counter 503 to increment as the byte or word is transferred.

In the meantime, an OR gate 518 determines if the connected adapter is a word (16 bits) transfer protocol, or if a cycle count of 2 is asserted in a byte transfer protocol. For either event, the OR gate 518 is asserted. When the output of the OR gate 518 is asserted and is ANDed with the cycle count of 1 at an AND gate 517, the output of the AND gate 517 indicates that one word or three bytes have been transferred, and that the maximum count has been reached. Thus, a signal is fed through an OR gate 519 to a flip-flop 515 which will be set at the beginning of the second word of transfer or at the fourth byte of the transfer. That signal propagates through an OR gate 516, then to a NAND gate 504A, which then causes the removal of the request signal from the DMAC. The DMAC will then make the last transfer in the cycle and at the end of that transfer cycle will relinquish its control of the global bus. The flip-flop 502A is also reset when counter 503 reaches its maximum value. Further, the counter hold signal on the counter 501 is then removed and the counter will again start sequencing.

At the next count, an output signal of the counter is applied to an AND gate 522. This signal is ANDed with a signal that results from arbitration logic (not shown), which indicates that the microprocessor would like to use the global bus. The output of the AND gate 522 is connected to the sequence counter 501 to latch the counter while the microprocessor uses the global bus. On the next sequence of the counter 501, the next port in the sequence as defined by the decoder is given an opportunity to gain access to the global bus 316, and so on in a round-robin fashion.

In the event that at initialization time, there is only one adapter and it is at port 0, time required to round-robin to each port can be saved by excluding ports 1-3 in the round-robin sequencing. The output of contention logic (not shown), which may be a part of the microprocessor for determining if there is only one adapter coupled to port 0, is applied o an input of a 74AS1804-type NAND gate 523. The sequence counter 501 is also coupled to the gate 523 and applies a signal which indicates the second successive count relative to the initial loaded count. When the second count is applied, the gate 523 is enabled and applies a signal to an AND gate 524. This signal is ANDed with a signal generated by the master clock to generate a signal to the sequence counter 501 to reload or restart the counter. Thus, for example, the counter would start at the count 0, go to 1 on the next clocking, then to 2, for a very short time before being reset back to 0. The function of this circuit is called "Faster." Although the present system only permits the faster function when port 0 is the only port having an adapter, this function can be expanded to round-robin only to any combination of adapters that are connected to the ports.

The signal functions on the gates and logic described supra in reference to FIG. 5 will now be described in detail. A signal CTRLOD+20 is applied to counter 501 at input G1 and permits the counter to be loaded with a predetermined value. The signal REQDMA+00 applied to input P of counter 501 indicates one of the DMA chips 305,306 on FIG. 3 and indicates that one of the 4 flip-flops 502A-502D has been set and that one of the adapters 212A-D FIG. 2) is set to receive/transmit a block of information. When this signal is asserted, it will cause counter 501 to stop counting during the transmission of data. Signal 68KBR+00 applied to input T of counter 501 causes counter 501 to stop counting when it is asserted in order to provide an opportunity for the microprocessor 301 on FIG. 3 to obtain possession of the global bus 316.

Output signals of the counter 501 COUNT1+00, COUNT2+00, and COUNT4+00 are applied to the input S input EN, 1 and 2 of the decoder 521, respectively. These signals correspond to count values from the output of the counter 501 and indicates when a port is to be given the opportunity to make a request. When the COUNT 1 signal is a logic zero (or true), it indicates that the microprocessor 301 is available to the system and causes the request lines which are at the outputs 00, 01, 02, and 03 of decoder 521 to be disabled.

There are two control signals DPPCLX and RQ--EN applied to inputs of gates 507A, 507B, 507C, and 507D, respectively. The dashes in the signal name RQ--EN designation may be substituted by A0, A1, B0, B1 for identifying a particular channel of the DMA controller, which is associated with a particular port. (0=A0; 1=A1; 2=B0; 3=B1) In other words, it should be noted that the outputs of decoder 521 are identified by names which vary in the third and fourth position of their name identifiers. In the third position, there will be either a capital letter "A" or capital letter "B"; whereas in the fourth position, there is a "0" or a "1". When an "A" is in the third position, it refers to DMA controller A 305; whereas if a "B" is in the third position, it refers to DMA controller B 306. Moreover, the combined third and fourth positions have the following significance. A0 indicates port 0 is to be serviced by DMA 1; where A1 indicates that port 1 is to be serviced by DMA 1. The "B0" in the third and fourth position indicates that port 2 is to be serviced by DMA 2; whereas B1 indicates that port 3 is to be serviced by DMA 2 also. The DPPCL-signal is asserted at the request of the adapter which will receive/transmit information at that time under control of the DMAC 405 through the interface 424 on FIG. 4. The X in the signal may be used to designate the port 0, 1, 2, or 3 from which the signal is asserted.

Gate 508 has the following signals applied to its inputs: PCL0GO+00, PCL1GO+00, PCL2GO+00, and PCL3GO+00. These signals are utilized to determine when one of the port's PCL lines has been asserted and has been allocated a time period on the global bus. When a PCL line has been asserted, and it is its allocated time, an output signal of gate 508 PCLXGO-00 is then applied to the flip-flop 509 as one of its inputs which sets the flip-flop 509, when clocked. Signal PCLXGO-00 is also applied to the AND gate 511 along with the signal BLKCTR+00 which is an output of the flip-flop 509. When these signals are a logic one (true), an output CYCLD-00 is generated which is then applied to counter 503 at input G1 and is the load enable function for that counter 503. The output BLKCTR+00 of flip-flop 509 is also applied as one input of flip-flop 510 at input CD.

A clock signal DMACLK+00 generated at gate 520 is also applied as a clock input for flip-flop 510 along with the above indicated signal (CYCLD-00). This signal preserves the phasing relationship of the clock to ensure that the request had indeed been sent and was stable before clocking and setting the flip-flop 510. The output of the flip-flop 510 is a signal PCLCLK+00 which is applied to the input of gate 512 for generating a clocking signal CYCCLK+10 which then clocks the counter 503.

Flip-flops 502A, 502B, 502C, and 502D have signals applied to them which are similar and perform similar functions except for different ports. For example, signal PCL0GO-00 applied to the CD input of flip-flop 502A is the inverted output of gate 507A. When this is a logic one (true), flip-flop 502A is clocked with the output BLKCTR+00 of flip-flop 509 which is also applied as an input to flip-flops 502B, 502C, and 502D. This flip-flop 502A generates output signal REQA0-00 which is applied as an input signal to gate 504A. The other input signal to gate 504A CYCCST+00 is generated by gate 516 and is asserted when counter 503 reaches its maximum value. Similarly, gate 518 is used to indicate when a word transfer device is attached, or when a byte transfer device has sent/received 2 bytes.

The output of gate 518 CT2WRD+00 indicates that word mode is active or two bytes have been transferred and applied to the input of gate 517. When a signal CYCCT1+00 is applied to the other input of gate 517 and is true, it indicates that counter 503 has transferred one word of data on a word transfer device or three bytes of data on a byte transfer device. When both the CT2WRD+00 and the CYCCT1+00 signals are a logic one (true), an output signal MAXCNT+00 is generated as the output of gate 517 and is fed through gate 519 and is applied as one input to flip-flop 515. This signal is then clocked by another input signal DMA-.AS+10 at input C of flip-flop 515. This combination of signals indicates that a maximum count value has been reached.

The output 2WDSET+00 of flip-flop 515 is applied as one input to gate 516 to generate signal CYCCST+00 and is also applied as an input signal to AND gates 504A, 504B, 504C, and 504D. When this signal is applied to these gates, the request signal from the port having issued the request to the DMA controller chip is removed. The system is then free to service the next requestor.

The next request may come from the microprocessor 301 which is given an opportunity to control the global bus between each port sequenced by the counter 501. The logic signal COUNT1+00 alternates between DMA cycles and is applied to the AND gate 522. If a request is made by the microprocessor 301 a signal BSREQ7-01 is also asserted to the AND gate 522. An output signal 68KBR+00 is applied to the input P of the counter 501 to latch the counter if a request is made.

When there is only one adapter and it is connected to port 0, a FASTER+00 signal is generated and applied to the AND gate 523. The signal COUNT2-00 which indicates the next count sequence following the servicing of this port 0 is also applied to the AND gate 523. When both signals are applied to the AND gate 523, the CTRLOD+10 signal is generated and is fed through the AND gate 524 to the counter 501 which reloads the counter 501.

While the invention has been particularly shown and described with reference to a preferred embodiment thereof, it will be understood by those skilled in the art that various changes in form and details may be made therein without departing from the spirit and scope of the invention, as defined by the appended claims.

We claim:

1. In a data processing system comprising a main memory and a CPU coupled to a system bus, and a peripheral sequence controller for accessing adapters coupled to respective peripheral devices, the peripheral sequence controller being coupled to the system bus and comprising:
   a microprocessor;
   a plurality of adapter ports, each for communicating with an adapter;
   logic means for polling each adapter port to determine if an adapter having peripheral devices is connected to the adapter port;
   a plurality of direct memory access means each for controlling a respective direct memory access to and from said main memory and to and from one of said peripheral devices through one of the adapter ports; and a sequencer means for sequentially enabling selected direct memory access means to have access to respective adapter ports for DMA data transfers between main memory and peripheral devices coupled to the adapter ports and for enabling the microprocessor access to the adapter ports to service interrupts after each direct memory access.

2. A sequence controller for accessing peripheral devices as claimed in claim 1 further comprising means for restricting the amount of data transferred to or from each adapter port during each direct memory access.

3. A sequence controller for accessing peripheral devices as claimed in claim 1 wherein the sequencer means comprises:
  a counter;
  a decoder in communication with the counter for separating each count into separate events;
  a first logic means for polling each adapter port and the microprocessor for request signals to determine if data is to be transferred to or from each adapter; and
  a second logic means which combines the request signals from each of the adapter ports and the microprocessor with one of the separate events for alternating access between each adapter port and the microprocessor.

4. A sequence controller for accessing peripheral devices as claimed in claim 3 wherein a count of the counter generates an event that is combined with the request signal from the microprocessor for gaining access to the global bus.

5. In a computer system having a plurality of peripheral devices, a main memory, a system bus, a CPU, a sequence controller for accessing peripheral devices, the sequence controller comprising:
  a microprocessor;
  adapter ports for communicating with the peripheral devices;
  direct memory access means for controlling direct memory accesses to and from main memory and to and from peripheral devices, the direct memory access means having one channel for each adapter port;
  a global bus in communication with the microprocessor and each said channel for allowing communication with the computer system; and
  an alternating sequence operation means for allocating successive time periods to each of the channels and the microprocessor in turn for controlling access to the global bus, wherein the alternating sequence operation means comprises: a counter for generating successive counts;
  a decoder in communication with the counter for separating successive counts into separate events;
  a first logic means for polling each adapter port and the microprocessor for request signals to determine if data is to be transferred to or from each adapter; and
  a second logic means which combines the request signals from each of the adapter ports and the microprocessor with each of the events for alternating access to the global bus.

6. A sequence controller for accessing peripheral devices as claimed in claim 5 further comprising logic means for determining which adapter port has an adapter with peripheral devices connected to it for limiting the alternating sequence operation means between channels to each adapter port having an adapter wit at least one peripheral device connected to it and the microprocessor.

7. A sequence controller for accessing peripheral devices as claimed in claim 5 further comprising logic means for determining that there is only one adapter having a peripheral devices coupled to it and limiting the sequence to that adapter and the microprocessor.

8. A sequence controller for accessing peripheral devices as claimed in claim 5 further comprising means for restricting the amount of data transferred per time period a predetermined number of bytes of data to or from each adapter port.

9. A sequence controller for accessing peripheral devices as claimed in claim 5 wherein a count of the counter generates an event that is combined with the request signal from the microprocessor for gaining access to the global bus.

10. In a data processing system comprising a main memory and a CPU coupled to a system bus, and a peripheral controller for accessing peripheral devices, the peripheral controller being coupled to the system bus and comprising:
  a plurality of adapter ports, each for communicating with a peripheral device;
  a plurality of direct memory access (DMA) means each for controlling transfers of data in direct memory accesses through one of the adapter ports to and from main memory and to and from a peripheral device;
  a microprocessor for establishing DMA data paths by transferring to the DMA means address parameters for a DMA transfer; and
  a sequencer means for sequentially enabling selected direct memory access means to have access to respective adapter ports for DMA data transfers between main memory and peripheral devices coupled to the adapter ports and for enabling the microprocessor access to the adapter ports to service interrupts after each direct memory access.

11. A controller for accessing peripheral devices as claimed in claim 10 further comprising means for restricting the amount of data transferred to or from each adapter port during each direct memory access.

12. A controller as claimed in claim 11 further comprising an adapter coupled to each port to buffer data to be transferred by each DMA means.

13. A controller as claimed in claim 10 further comprising means for limiting an enabling sequence of the sequencer means where a peripheral device is not coupled to a port.

* * * * *